US012802252B2

(12) United States Patent
Mian et al.

(10) Patent No.: US 12,802,252 B2

(45) Date of Patent: Nov. 17, 2026

(54) DETECTION OF BROKEN OR FLAWED WHEELS

(71) Applicant: International Electronic Machines Corporation, Troy, NY (US)

(72) Inventors: Zahid F. Mian, Loudonville, NY (US); Mark R. Pearlman, Clifton Park, NY (US)

(73) Assignee: International Electronic Machines Corp., Troy, NY (US)

(*) Notice: Subject to any disclaimer, the term of this patent is extended or adjusted under 35 U.S.C. 154(b) by 214 days.

(21) Appl. No.: 17/390,197

(22) Filed: Jul. 30, 2021

(65) Prior Publication Data

US 2022/0036576 A1 Feb. 3, 2022

Related U.S. Application Data

(60) Provisional application No. 63/062,596, filed on Aug. 7, 2020, provisional application No. 63/059,157, filed on Jul. 30, 2020.

(51) Int. Cl.

| | |
|---|---|
| ***G06T 7/62*** | (2017.01) |
| ***G06F 18/214*** | (2023.01) |
| ***G06V 10/44*** | (2022.01) |
| ***G06V 20/54*** | (2022.01) |

(52) U.S. Cl.

CPC .............. *G06T 7/62* (2017.01); *G06F 18/214* (2023.01); *G06V 10/44* (2022.01); *G06V 20/54* (2022.01); *G06T 2207/30236* (2013.01); *G06T 2207/30248* (2013.01); *G06V 2201/08* (2022.01)

(58) Field of Classification Search

CPC ............. G06T 7/62; G06T 2207/30236; G06T 2207/30248; G06T 2207/10152; G06T 7/0004; G06F 18/214; G06V 10/44; G06V 20/54; G06V 2201/08; G06V 2201/06; G06V 10/143; G06V 10/82

USPC ......... 382/103, 190, 286; 356/603; 348/143; 701/31.4

See application file for complete search history.

(56) References Cited

U.S. PATENT DOCUMENTS

| | | | | |
|---|---|---|---|---|
| 6,549,288 | B1 * | 4/2003 | Migdal | G06T 7/521 356/601 |
| 7,176,440 | B2 * | 2/2007 | Cofer | G08B 13/19604 250/221 |
| 8,111,387 | B2 | 2/2012 | Douglas et al. | |
| 10,435,052 | B2 * | 10/2019 | Mesher | G01B 11/2522 |
| 10,475,201 | B1 * | 11/2019 | Hall | G01B 11/105 |
| 10,554,918 | B1 * | 2/2020 | Derakhshani | G06V 40/19 |
| 10,723,373 | B2 * | 7/2020 | Mesher | G06T 7/521 |
| 11,385,137 | B2 * | 7/2022 | Samadani | B61L 15/0081 |
| 2006/0098843 | A1 | 5/2006 | Chew | |
| 2007/0064244 | A1 * | 3/2007 | Mian | G01B 11/25 356/601 |
| 2009/0046279 | A1 * | 2/2009 | Tentrup | G01B 11/2755 356/139.09 |
| 2010/0100275 | A1 * | 4/2010 | Mian | G01M 17/08 382/284 |

(Continued)

*Primary Examiner* — Kathleen Y Dulaney

(74) *Attorney, Agent, or Firm* — LaBatt, LLC

(57) ABSTRACT

A system and method for the detection and identification of flaws on vehicle wheels is described. A preferred embodiment for the detection and identification of flaws on railroad wheels is specifically described, involving particular designs and approaches in imaging and analyzing images of said wheels.

24 Claims, 10 Drawing Sheets

(56) References Cited

U.S. PATENT DOCUMENTS

| | | | | |
|---|---|---|---|---|
| 2011/0102779 | A1* | 5/2011 | De Sloovere | G06T 7/521 356/139.09 |
| 2012/0057758 | A1* | 3/2012 | Yang | G06F 18/22 382/106 |
| 2012/0294510 | A1* | 11/2012 | Zhang | G06V 10/145 382/154 |
| 2013/0083188 | A1* | 4/2013 | Mian | B60T 17/228 348/135 |
| 2013/0153651 | A1* | 6/2013 | Fedorovskaya | G06K 5/00 235/494 |
| 2013/0156330 | A1* | 6/2013 | Kane | G07D 7/12 382/218 |
| 2014/0160283 | A1* | 6/2014 | Hofman | G06V 10/147 348/143 |
| 2014/0333771 | A1 | 11/2014 | Mian et al. | |
| 2014/0339374 | A1 | 11/2014 | Mian et al. | |
| 2014/0371911 | A1 | 12/2014 | Mian et al. | |
| 2015/0110350 | A1 | 4/2015 | Mian et al. | |
| 2017/0227470 | A1 | 8/2017 | Cesarano | |
| 2018/0283992 | A1* | 10/2018 | Alemi | G01M 17/10 |
| 2018/0339720 | A1 | 11/2018 | Singh | |
| 2019/0073568 | A1* | 3/2019 | He | G06T 7/001 |
| 2019/0325601 | A1* | 10/2019 | Chen | G06T 7/0004 |
| 2020/0005084 | A1* | 1/2020 | Ambikapathi | G06V 10/82 |
| 2020/0105005 | A1* | 4/2020 | Grossinger | G06T 7/521 |
| 2020/0408682 | A1* | 12/2020 | Mian | G01N 21/47 |
| 2021/0058588 | A1* | 2/2021 | Abreo | G01S 13/34 |
| 2021/0374448 | A1* | 12/2021 | Jacquot | G06V 10/771 |
| 2022/0172335 | A1 | 6/2022 | Mian et al. | |
| 2022/0292705 | A1* | 9/2022 | Friedman | G06V 10/82 |

* cited by examiner 50
52
54
56
58
60
62

50
52
54
56
64
66
68

50
52
54
56
70
72

50
52
54
56
74
76

DETECTION OF BROKEN OR FLAWED WHEELS

REFERENCE TO RELATED APPLICATIONS

The current application claims the benefit of U.S. Provisional Application No. 63/059,157, filed on 30 Jul. 2020, and U.S. Provisional Application No. 63/062,596, filed on 7 Aug. 2020, which are hereby incorporated by reference.

TECHNICAL FIELD

The disclosure relates generally to the detection and identification of damage, breaks, or flaws on or in railroad wheels.

BACKGROUND OF THE INVENTION

Wheels and associated elements, such as tires and rims for commercial vehicles, are constantly exposed to wearing and damaging forces when in operation, as they are in constant moving contact with a hard surface which can and does wear away portions of the wheel/tire surface. In particular, railroad wheels develop flaws over time, usually on the tread of the wheel but on occasion elsewhere, including the flange; tires of commercial vehicles wear and are damaged during use, particularly in the wearing down of tread. Wheels are inspected regularly and condemned if they are too worn or damaged to meet specifications; however, as there are many millions of wheels in rail service and tens of millions of tires in commercial road service, it is inevitable that many defective wheels are missed; some of these wheels may fail in a way that leads to accidents of varying degree in commercial vehicles and derailments in rail service, and will certainly add wear and tear to the infrastructure due to increased impact and vibration, or in the case of commercial vehicles less control and reduced operating efficiency.

BACKGROUND ART

There are a number of current art or in-development systems that seek to detect and measure such flaws on railroad vehicles; many such involve the use of a laser line or lines projected on a wheel to produce a structured-light pattern for measurement based on triangulation of the visible linear points. These systems, however, tend to be not merely expensive and often power-hungry but limited in their accuracy, in their demands for challenging and difficult alignment to be maintained even in the field, and in their imaging technology. In addition, these have rarely if ever been applied to non-rail vehicles. The present invention addresses these issues through innovative use of flexible illumination approaches and an awareness of the advantages of additional imaging methodologies.

U.S. Pat. No. 10,435,052 entitled "Broken wheel detection system" and U.S. Pat. No. 10,723,373 entitled "Broken wheel detection system" detect broken wheels on rail cars, based on illuminators which project multiple parallel lines. Parallel line generation can be technically challenging and expensive, whereas the present invention allows for illumination of more affordable multi-line generators which may produce a set of non-parallel lines. In fact, the present invention does not even require the projection of multiple lines from a single illuminator. At least one embodiment of our invention allows for the projection of a single line for each section of rail. Finally, the present invention is not even constrained to the projection of lines. Illumination of sufficiently dense patterns (e.g. dot array) allows for resolution of defects and anomalies while requiring less power than illumination of a continuous line.

U.S. Pat. No. 8,111,387 entitled "Methods and systems for wheel profile measurement" identifies measurements and features of a vehicle wheel rim surface, where the wheel is mounted to a stationary shaft, such as a wheel balancer or tire changer. In contrast, the present invention allows the identification and measurement of wheel features with the wheel mounted on a moving vehicle. The ability to capture this information without having to remove wheels from the vehicle minimizes inspection cost and fleet disruption.

SUMMARY OF THE INVENTION

The invention described is intended to overcome some of the limitations of current art methods of detecting broken or flawed vehicle wheels or tires. Current art devices exhibit multiple limits including strong limitations on the illumination used to gather data on the wheel, operation in various lighting conditions, and others.

In one preferred embodiment, the invention comprises three units with imaging and illumination apparatus set along a path of vehicle travel; in a specific embodiment, the path of vehicle travel is a rail for railroad rolling stock. The units are set along the rail, such that they can image at least one full revolution of any passing wheel, and illuminate it with any of a variety of patterns, illuminate in a variety of illumination scanning methods, image acquisition by a using a variety of image acquisition devices including but not limited to 1D cameras, 2D cameras, single element detectors, and image acquisition in any of a variety of spectra. Other embodiments of various devices and systems related to this basic concept are also described.

Specific innovations described and claimed below include:

Use of non-continuous patterns or non-parallel line patterns designed to provide equal or better measurement accuracy with lower optical power demand and less physical complexity.

Use of different illumination and imaging spectra to ensure clear and usable imagery in any weather and lighting.

Ability to select methodologies of illumination and imaging in a manner appropriate to the current weather and lighting conditions.

Illumination and detection in eye-safe spectra to ensure that the proposed invention can be operated within safe illumination limits.

Ability to generate non-continuous patterns by using an illumination scanner which can generate patterns one pattern at a time, repositioning the beam, and then generating the remaining patterns. Associated with this innovation, ability to detect reflection from one pattern (e.g. a dot) at a time by using fast optical sensors, time of flight sensors, time of flight cameras, single element optical elements, multi-element optical elements, optical cameras, etc. irrespective of the spectrum in which they operate.

Cost effective implementation of a wheel flaw detection system which can operate at main line train speeds or highway speeds Innovative implementation of a wheel flaw detection system which can provide real-time processing of wheel health data Method for characterizing non-planar illumination paths (paths from generally non-linear shaped illumination elements) resulting in reduced imaging error.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figures 1A, 1B:
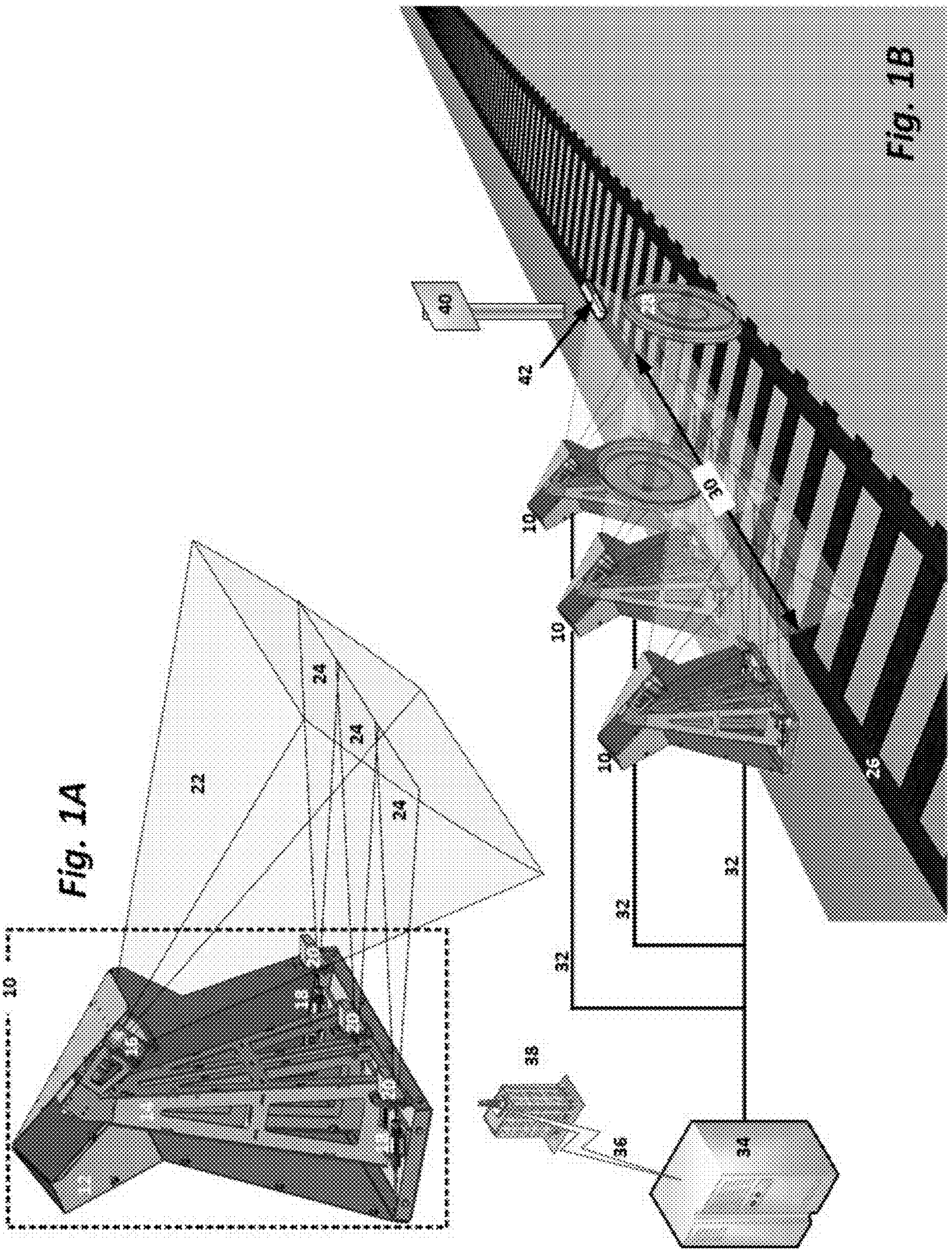
FIG. 1A illustrates a single unit of the preferred embodiment of the invention.
FIG. 1B illustrates a complete system embodiment of the invention.

In FIG. 1*a*, a physical embodiment 10 of the system is shown. The embodiment 10 comprises an enclosure 12 and a supporting structure 14. Supporting structure 14 supports and maintains the physical relationship between an imaging device 16 and an illuminating device or devices 18; the enclosure 12 is designed such that it protects the imaging device 16 from weather, dirt, etc., and the illuminators 18 are also protected by shades or hoods 20. In the preferred embodiment, the imaging device 16 is a camera with an imaging array which is sensitive to some band or bands of the electromagnetic spectrum, including but not limited to ultraviolet light, visible light, infrared and X-rays, Gamma rays, etc. and the illuminating devices 18, can be for example, lasers or other illumination sources, whose wavelength lies within those regions. It is however not to be assumed or construed that other means of imaging or illumination are restricted; for example, the camera 16 may be a line-scan camera, or the illuminating devices may be LED illuminators, fluorescent bulbs, or any other means of illuminating the target of the device.

It is also not to be assumed that the supporting structure 14 and enclosure 12 must be separate; they may be a single structure. Alternatively, there may be only a supporting structure 14 and the imaging devices 16 and illuminators 18 are individually sealed and protected from environmental effects, thus obviating the need for an enclosure 12.

The imaging device 16 also has a field of view 22, which encompasses the expected region through which targets may be presented to the imaging device 16. The illuminators 18 are arranged such that they ensure substantially seamless illumination of a target object through some set of integrated illumination projections 24 over at least one revolution of the target object. There may be one or more than one illuminator 18. In the event that there are two or more illuminating devices 18, they will have sufficient overlap of their projected illumination 24 to ensure this seamless illumination. This illumination 24 is similarly constrained to be projected such that its intersection with any presented target will fall within the field of view 22 of the imaging device 16.

In any event, in the preferred embodiment shown in FIG. 1*b*, some number of systems 10 are arranged along a rail 26, in such a fashion that the illumination projections 24 from the devices 18 for each system 10 overlaps sufficiently to ensure seamless illumination of any presented target, and similarly that the fields of view 22 from each imaging device 16 overlap to ensure continuous coverage of the target over a path. In the case of FIG. 1*b*, the targets of interest are wheels 28 which, as parts of passing trains, pass through the fields of view 22 of the systems 10. The systems 10 are arranged to cover at least one full revolution 30 of the presented wheels 28.

This design ensures that the systems 10 can in combination sense and evaluate any wheel that may pass through the imaging area. It is understood that while three systems 10 are shown in FIG. 1*b* there is neither a stated nor implied requirement that any embodiment of the system must use any particular number of the systems 10 except as may be required by the application.

In addition, it should not be construed that both illumination and imaging systems must be contained within the same housing. For example, a line of illuminators 18 may be placed along a rail 26 to provide seamless illumination along a given path 24. Separately, an imaging device or imaging devices 16 may be mounted anywhere that the illuminated path 24 would be visible in the field or fields of view 22. As such, any combination of imaging devices 16 and illuminators 18 may be envisioned as conforming to the basic requirements of this invention, as long as they permit the basic function and operations described herein.

In any event, the imaging devices 16, howsoever selected or situated, produce data that is transmitted 32 to a processing system 34. The processing system 34 performs operations upon the images that determine the condition of the wheels passing the system, and the data and alerts relating to the condition of the wheels may be transmitted 36 to a remote system 38, which may be a maintenance scheduling system, a human-operated terminal, a data repository, or other system which may be able to make use of the information from the processing system 34.

This processing system 34 is illustrated as being separate but directly connected to the various systems 10. It should be obvious to those skilled in the art that it would also be possible that the processing system could be placed within one or a number of the systems 10, even integrated with the cameras 16 themselves. It should also be obvious to one skilled in the art that the data connections 32 and 36 may be wired or wireless as needed; also, it may be that the raw data is sent directly to the remote system 38, where all processing of the data would then take place.

To properly operate and be able to gather useful data, the system must be able to identify when a wheel is present, and by preference be able to associate any data produced with a specific wheel on a specific car. This permits the system to be able to advise on the need for servicing of a particular wheel on a car, and also to perform trending analyses on wheel data accumulated over multiple readings. Thus the preferred embodiment of the invention also includes a means of identifying the cars, such as an AEI tag reader 40, and a wheel detector 42, which in combination with appropriate software will provide all the data needed to identify a particular wheel and car and trigger the individual systems 10 to acquire data on the wheels.

Figures 2A, 2B, 2C, 2D:
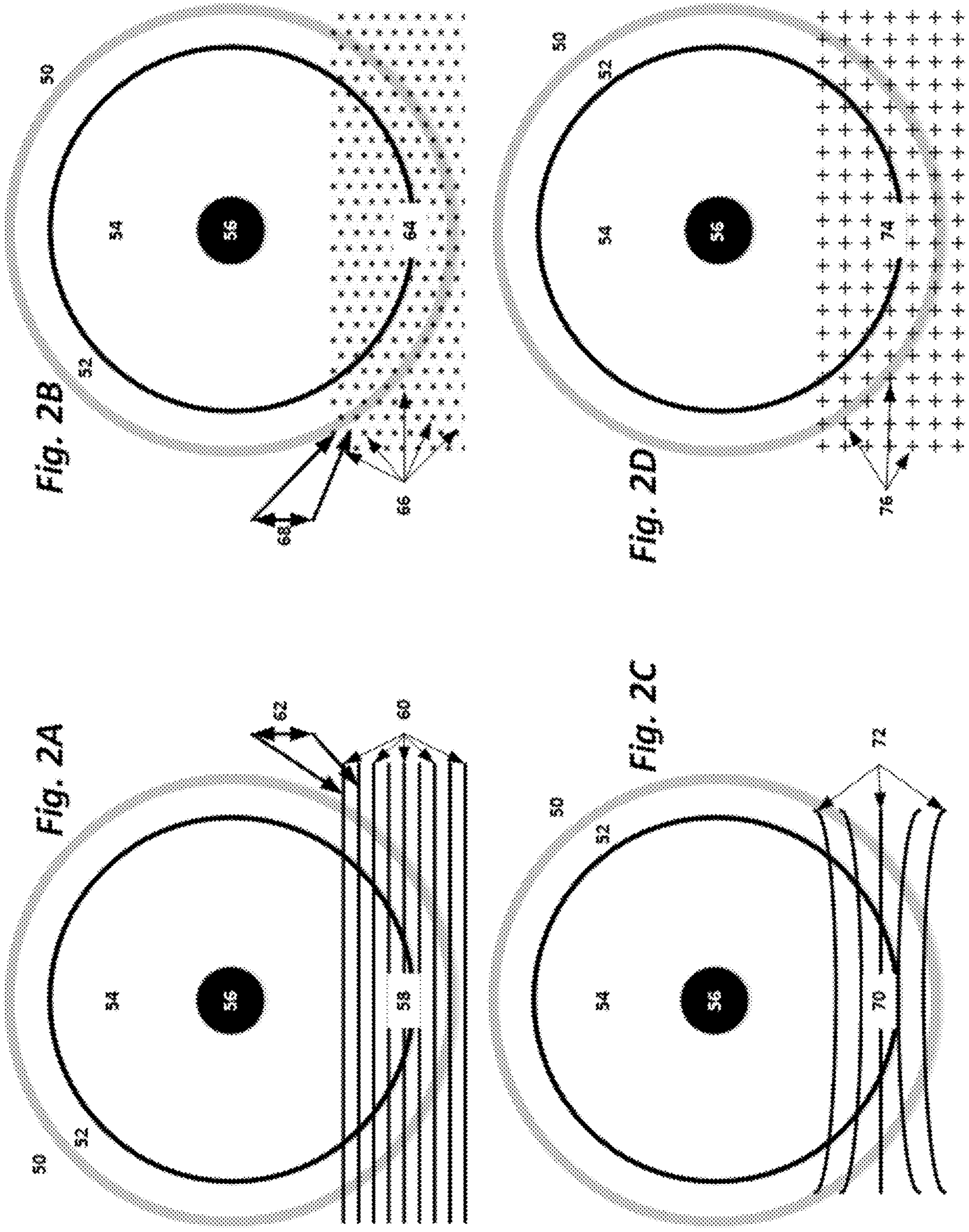
FIG. 2A illustrates the illumination of a wheel with parallel lines.
FIG. 2B illustrates the illumination of a wheel with a pattern of dots.
FIG. 2C illustrates the illumination of a wheel with a pattern of nonparallel lines.
FIG. 2D illustrates the illumination of a wheel with a pattern of crosses.

The illumination of the target wheels 28 is itself a significant challenge. Current-art systems tend to illuminate wheels with continuous laser lines of considerable power, which can produce glare, have a significant energy cost, and at higher powers can be a potential danger to humans and animals in proximity to the system. FIG. 2*a* illustrates this typical approach, with a wheel 50, comprised of a rim and flange 52, the wheel face 54, and the axle and bearing 56. In FIG. 2*a* the wheel is illuminated 58 by a pattern of multiple lines 60; these lines 60 are spaced such as to cover a vertical section of the wheel 50 to a given degree of fineness; for purposes of discussion, we will assume the separation or spacing 62 between lines 60 is one quarter of an inch (0.25"), but any spacing 62 consistent with the goals of the system's users is appropriate. The spacing 62 of the lines 60 determine the minimum size of features that may be reliably detected and defined. Such approaches, among others, are discussed in inventors' prior U.S. Pat. No. 7,564,569 Optical Wheel Evaluation.

The preferred embodiment as seen in FIG. 1 uses three systems 10 spaced along a single full revolution of the wheel on the rail; by this, it can be seen that each system 10 is responsible for examining one-third of the wheel (slightly more, in practice, to ensure seamless overlap of measurement). The use of three systems 10 as an exemplar embodiment should not be taken to indicate that this is a necessary component of the invention, and any number of systems 10, may be used for an embodiment as appropriate. Continuing with our three system 10 example, as the imaging device 16 will acquire multiple frames of imagery, the rate of acquisition of these frames (and the shutter speed with which the frames can be acquired) will also be a determinant in the resolution of any flaws on that third of the wheel.

A wheel of 36 inches in diameter has a circumference or path length of nine feet five inches. If the wheel is assumed to be traveling at twenty miles per hour (roughly 29 feet per second), this means that it will traverse the entire path length in just under one-third of a second, with each camera 16 having slightly more than one tenth of a second to acquire images. If the camera has a frame rate of 100 frames per second, this means 10 frames, in which the wheel will rotate ⅓ of its circumference of 113 inches, resulting in each frame representing a rotation of the wheel by about 3.8 inches; if the pattern of illumination from the illuminators 18 covers a full rotational arc greater than this, the spacing of the pattern will be the upper limit of flaw detection.

If, on the other hand, the camera 18 has a frame rate of 2000 frames per second, each image represents a rotation of 0.19 inches. As a rotation of a wheel through a horizontal line that represents a chord of the wheel will cause the line to pass over the entire surface of the wheel to the depth of that chord, this means that the upper limit of flaw detection will be 0.19 inches—the rotational spacing per frame. This assumes a shutter speed (time over which the image is actually acquired) of sufficient speed that is negligible compared to the frame rate, otherwise significant blurring will occur.

However, a continuous line is therefore illuminating areas which are not necessary for the detection of targets of twice the spacing; in doing so, it is expending energy which is not needed. Maintaining multiple parallel lines is even more energy intensive, and also requires multiple carefully-aligned projectors or expensive optics to achieve.

FIG. 2*b* illustrates another method of illumination which may be used to detect a flaw of any given size for less energy expenditure. A wheel 50 of the same type described in FIG. 2*a* is illuminated 64 by a pattern of dots 66. Such a pattern of dots 66 may be generated from a single source of illumination such as a laser using an appropriate optical design. With this design, the spacing 68 of the dots 66 may be set to any interval; presuming the spacing 68 of the dots 66 to be identical with the spacing 62 between the lines 60, the same size of flaw may be detected with either version; however, as the pattern of dots 66 may be drawn from a single illumination source 18 and the lines 58 must be from individual illuminators 18, the complexity of the system involving the dots is drastically reduced, as is its cost. Moreover, because the energy of the illuminator 18 is distributed across the dots 66 and not across a line that covers redundant areas of the wheel 50, it is possible for the dots 66 to retain an intensity and thus visibility of the same order as that of the individual lines 60. This innovation reduces complexity, reduces cost, and reduces energy consumption; in addition, it also improves general safety by reducing the overall illumination energy that may be reflected to any viewer.

Another approach to illuminating the targets is shown in FIG. 2*c*. The lines 60 shown in FIG. 2*a*, as noted, generally require either individual illuminators 18 or expensive and well-aligned optics to produce, as they are all substantially parallel. The latter may assist in some computational areas, but in truth the key to accurate measurement of an illuminated target depends primarily on the precision to which the intersection points of the illumination and the target is well-characterized, rather than on a specific geometry of that intersection. In FIG. 2*c*, a wheel 50 as before is illuminated 70 with a pattern of lines 72 which are not uniformly parallel or straight. This pattern is generated from a single illuminator 18 with an inexpensive beam splitter; the angle of divergence from the original beam path causes some degree of curvature at the intersection with a target object, but that curvature can be well-characterized and even used to some degree. This approach thus also may save power, complexity, and so on in the design and use of the present invention. Similarly, one can envision the use of straight but non-parallel lines for similar purposes.

Yet another illumination approach is shown in FIG. 2*d*. In this figure, a pattern 74 of crosses 76 are projected on a wheel 50; this pattern requires less power than a crosshatch pattern of vertical and horizontal lines, but still provides additional data in both horizontal and vertical directions when compared to the prior pattern in FIG. 2*b* of simple dots. Multiple other patterns and forms of illumination may be envisioned.

In all of FIGS. 2*a* through 2*d*, the illumination pattern is shown to cover some portion of the wheel; it should be noted that this may be any chosen portion of a wheel, from a single line run along the lowest portion of the wheel to a pattern projected over the entire visible face(s) of the wheel, taking into account the cumulative pattern of the projection on the wheel face(s) as it passes through the illumination area.

As noted previously, the safety of the system may be affected by the intensity of the illuminators 18; lasers, for example, may reflect from various surfaces on railroad wheels, and a reflected laser beam is well known by those skilled in the art to have potential dangers for unprotected viewers. At the same time, a system such as that presented here may be expected to operate outdoors in a wide variety of settings, at any time of the day or night, in any conditions. This presents a number of challenges to the system, some physical, and some operational. In operational terms, the changing illumination between day and night covers a span of roughly 10^10 times in terms of varying brightness. In order to maintain a clear contrast between ambient—even indirect—illumination and the projected illumination 24 as it intersects with the target, it is necessary for the projected illumination to significantly exceed the intensity of the existing light; however, illumination intensity sufficient to overcome sunlight can easily exceed safety thresholds and also requires considerably greater power than, for example, the intensity needed to illuminate the target sufficiently in the evening.

This challenge applies most, however, to the visible light spectrum. Natural daylight emission peaks in the green region of the spectrum at approximately 500 nm and is very strong from around 250-300 nm up through approximately 1000 nm (effectively the visible spectrum, which runs from roughly 380 through 740 nm, with considerable individual variation). Other conditions in the atmosphere, such as dust, snow, and rain, can significantly disperse or absorb visible light, leading to significant attenuation of the transmitted signal.

Both of these conditions indicate another solution not generally used in the current art: the use of imaging devices 16 attuned to a region of the spectrum that is not visible light, and similarly illuminators in that region of the spectrum. Even near-infrared (NIR), in bands from 750 nm through about 1000 nm, provides significantly improved contrast for a given level of artificial illumination in daylight, and has an additional advantage that many ordinary CMOS cameras are sensitive up to about 1500 nm. Cameras sensitive in midwave infrared (MWIR) and long-wave infrared (LWIR) are more expensive, but provide even better contrast over daylight, barring a direct solar influx to the imaging device. MWIR and LWIR also penetrate dust, fog, rain, and snow better than visible light; NIR also penetrates somewhat better than standard visible light. Thus, one preferred embodiment of the invention specifically includes NIR-sensitive cameras 16 and NIR illuminators 18.

It should be obvious to anyone familiar with the art that one can also use SWIR-sensitive cameras 16 and SWIR illuminators 18 to achieve a solution which can work in fog, rain, snow, etc. without deviating from the intent behind the present invention. Also, it is worth mentioning that SWIR region, e.g. 1500 nm is particularly eye-safe as any one of the multi-line, multi-pattern illuminations may require significant energy, e.g. many watts of laser power, to illuminate the wheel at the same time thereby making is inherently unsafe to operate when operated in open field conditions near human beings.

Additionally, specific laser wavelengths—roughly exceeding 1400 nm and less than 3000 nm—are considered "eye-safe" as they tend to be absorbed by the lens and cornea rather than passing to the far more sensitive retina; there are cameras specifically available in this SWIR band, such as Allied Vision's "GoldEye G-033". Use of such a camera with appropriate illuminators renders the present invention safer, lower power, and more effective in normal illumination and weather ranges.

In an alternate embodiment of the invention, illuminators 18 emit focused energy in one or more bands of the electromagnetic spectrum that are readily absorbed by the target object. This absorbed energy is then converted to thermal energy, which the target object radiates out in MWIR and LWIR bands that are detected by LWIR "thermal" cameras 16.

Figure 3:
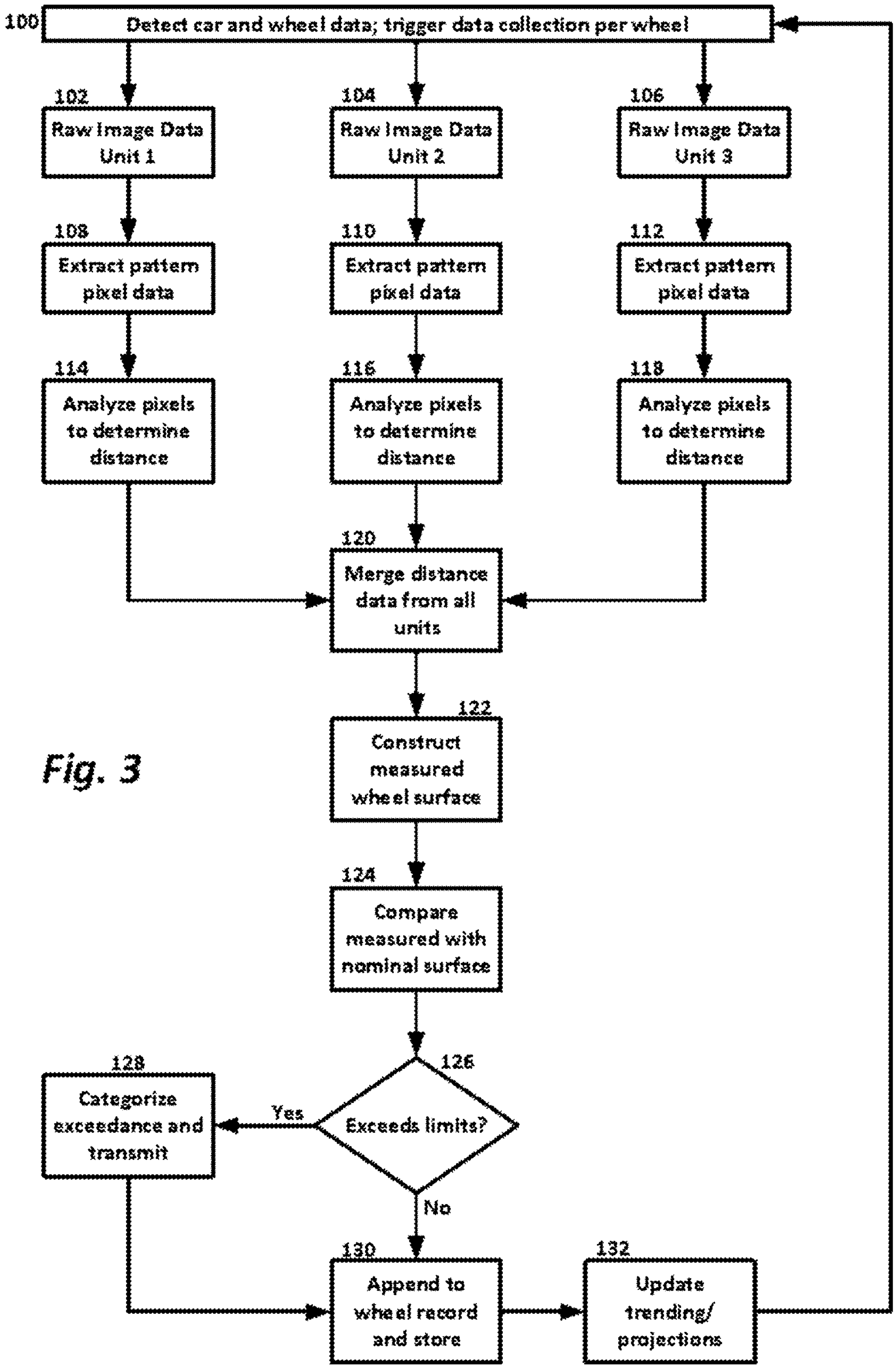
FIG. 3 illustrates a possible methodology of data analysis by the invention

The overall invention also includes software to collect and make use of the data produced from the physical systems 10. FIG. 3 shows an illustrative flowchart of one embodiment of the software of the invention.

The system is triggered 100 upon acquisition of car data and detection of wheel presence, upon which all of the individual system units 10 begin to collect data on each wheel. In FIG. 3 it is assumed there are three system units 10, but as previously noted there may be any number of such units as may be needed for a particular instantiation of the overall system.

In any event, the units collect raw image data 102, 104, 106, which is then processed to extract the specific pixels illuminated by the selected illumination pattern 108, 110, 112; with knowledge of the geometry between the rail, the illuminators, and the camera the extracted pixels are analyzed to determine their individual positions 114, 116, 118 from their recording camera. This position data is merged from all units 120 to produce a set of positions equating to the linearly unfolded rim and flange of the wheel. While the rim and flange are shown as the targets, it is here noted that the present invention is in no way restricted to rim and flange, but can with appropriate optics and positioning measure any portion of a passing wheel.

In any event, the merged position data is then processed to construct the measured wheel surface 122, which may be thought of as a three-dimensional image or heat map of the relevant portions of the wheel, which encodes variations in the surfaces detected to the resolution of the system. The constructed wheel surface is compared with a nominal wheel surface 124 and examined to determine if one or more variations of the surface exceed parameter limits 126 for that portion of the surface; parameter limits may be permanently encoded in the system, or may be variable and updated by local or remote actors as desired by the owner.

If one or more exceedances are found, they are categorized (rim crack, flange missing piece, etc.) and transmitted 128 for action; one possible destination would be to the service yard, flagging the particular wheel and car as in need of service. Once this transmittal is complete, the data is appended 130 to the record for that particular wheel, and any trending/projections for the wheel are also updated 132. If no exceedances are found, the system appends 130 the data to the record for that wheel and updates the trending/projections 132 for that wheel. The system then returns to the initialization state once all car wheels have been measured.

Note that FIG. 3 assumes the preferred embodiment with 3 imaging systems 10; as mentioned previously, it is not an essential part of the invention that there be a specific number of the imaging units 10, and in fact, if the imaging pattern projected on the target covers all of the wheel at once (something feasible for many freight rail wheels), a single imaging system 10 would suffice to capture the entirety of the wheel; in such a case there would be no need to cross-register or merge images as there is only one imaging source and perspective.

A single imaging unit 10 also suffices to capture the entirety of the wheel as long as it is able to acquire images of a pattern projected on the wheel over at least one full revolution. It should be obvious to anyone skilled in the art that the present invention also covers any and all parts of the wheel, axle, surrounding material, components, etc. which can be images by the embodiments described in the present invention.

Figure 4:
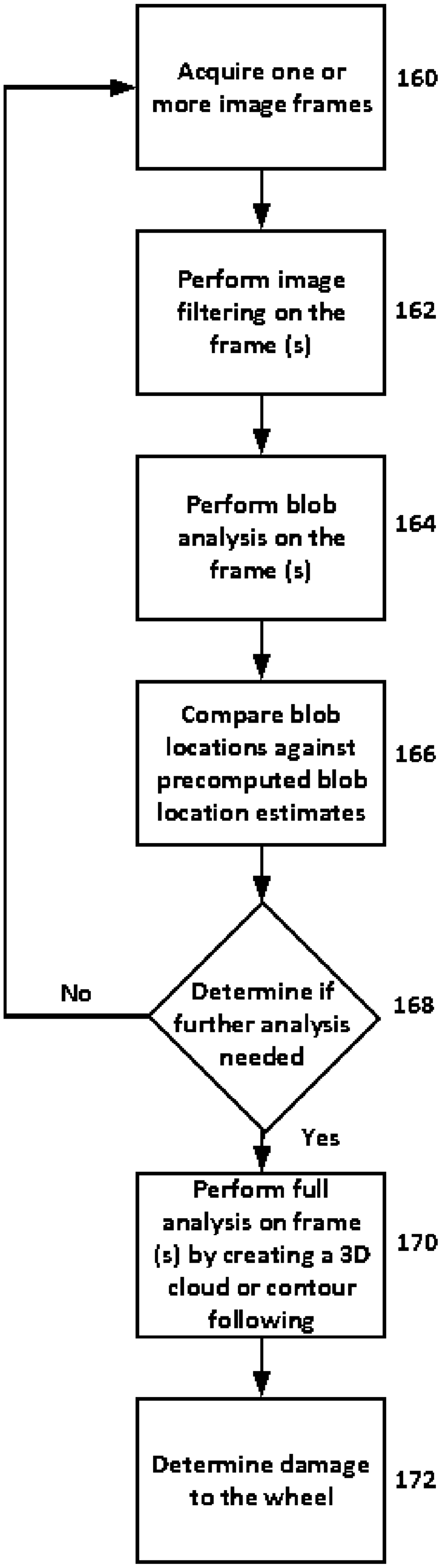
FIG. 4 illustrates a possible methodology by using a multi-step image analysis method

In FIG. 4, we describe a novel image processing sequence which is fast, suitable for high speed train operation due to low complexity, and applicable to this invention. The image acquisition system embodiment 10 acquires one or more image frames 160 by performing image capture. The acquired images are then processed by using filtering 162 or other image enhancement methods to improve on image quality. The output from filtering 162 is then processed to perform a blob analysis 164 (also known as point or feature analysis) by using, for example, blob analysis operation in Image Processing Toolbox from MATLAB and others. Each blob location is compared 166 against precomputed blob location estimates (i.e., known/expected wheel features) to see if a blob indicates a normal or abnormal location where an abnormal location will represent a defect. If abnormal blob is found via test 168, then full analysis of the frame is carried out by creating a 3D cloud or contour analysis 170 by using cloud analysis techniques familiar to anyone skilled in the art; from the full analysis 170 the system or a viewer can determine 172 the damage to the wheel. The FIG. 4 image processing sequence can significantly save on computational demand, as only occasional frames will need to be fully processed to verify defects while the vast majority of the wheels will show no abnormalities requiring detailed analysis.

A variation on the image processing sequence in FIG. 4 substitutes blob analysis 164 and comparison 166 with a deep learning model. This deep learning model, in preferred method uses convolutional neural network (CNN), takes imagery of the target object as input and provides information about the number, location and category of abnormalities as output. This capability is embedded within the deep learning model through a training process that occurs prior to system deployment. During the training process, the model is presented with a set of representative images of the target object. This set includes images of wheels with no abnormalities, as well as wheels with one or more abnormalities. These images are labeled with the number, type and location of any abnormality. Through an iterative process, the model's internal parameters are refined so that its output matches the information from the image labeling. Proper training allow the deep learning model to locate and detect defects on new images of target objects, under various environmental conditions, with high accuracy and low miss rates.

Image processing sequences as described or derived from FIG. 4 can be applied to individual wheels or can be applied jointly to a set of wheels. For example, the set of wheels may belong to the same truck, same vehicle or same train. Joint analysis of wheels allows the software to identify deviations from predetermined estimates, thresholds, models, etc. that may be normal for certain wheel types.

The above has focused on a specific preferred embodiment of the invention. There are numerous alternative embodiments of the same invention.

Figure 5:
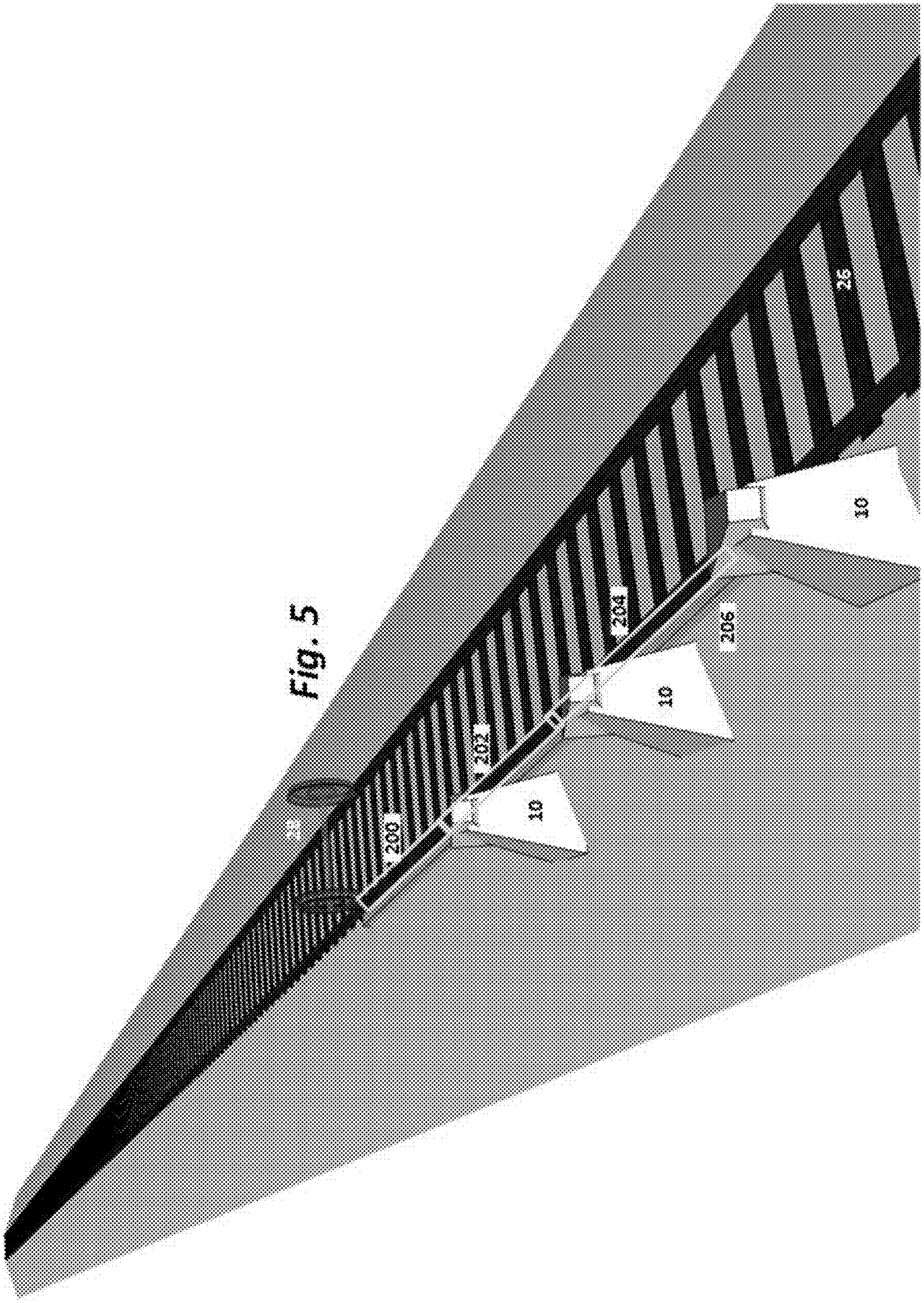
FIG. 5 illustrates an alternate embodiment where the tread of the wheel is imaged instead of the side being imaged

1. Different imaging configurations. All of the Figures thus far have shown a default preferred arrangement, in which the target wheel is imaged on its field-side face. This is useful for detecting damage or flaws to the face, rim, and flange. However, one of the areas of the wheel which is most subject to damage is the tread. To image the tread of the railroad wheel requires a different angle of view and thus a different embodiment of the system, as shown in FIG. 5. A series of three imaging systems 10 is shown next to a set of tracks 26 down which a wheelset 28 proceeds (the rest of the train of which the wheelset is a part is not shown for purposes of clarity). However, in FIG. 5 the imaging systems 10 are positioned and angled such that they look down the tracks 26 at a shallow angle that permits the imaging system 10 to see the wheel 28 tread as it proceeds down the tracks 26. Each of these systems 10 are provided with optics that provide a large depth-of-field so that each can image the wheel along a significant portion of a revolution; the first system 10 has the first portion of the revolution 200, the second system 10 has a field of view 202 which overlaps with 200 and then extends until it is overlapped by the field of view 204 for the third system 10. In this manner the proposed invention obtains clear images of the wheel tread throughout its progress down the rail 26. It is also not to be assumed that this approach requires three units; fewer or more may be used. Also, to ensure an even and reliable illumination of the wheel, the units 10 may not have the illuminators 18 as previously described, but instead an illumination assembly 206 may be placed along the rail (on the field side, as shown, or the gauge side, if desired); such an assembly may be equipped with lasers, beam-splitters, pattern generators, or any other illumination methodology appropriate to the situation.

2. Selectable imaging modality. As discussed in inventors' patent 10,202,135 (Operations monitoring in an area), there are conditions of both lighting and weather/temperature which may render any single modality (visible light, or long-wave infrared, or others) less effective, or even ineffective, at acquiring usable images of a target; for example, darkness or extreme glare may cause visible light cameras to be unable to acquire useful images; similarly, hot spots on or near a target may confuse a thermal imaging camera. These conditions may be encountered in the environment of the present invention. Therefore, an alternative embodiment of the invention is one in which there are two or more imaging devices present in each imaging segment of the invention, each of the two or more devices being sensitive to a different spectrum of light. For example, one camera may be sensitive to visible and near-infrared light, while another could be sensitive to long-wave thermal infrared. In these cases, there would be a number of sets of illuminators 18, each set corresponding to one of the imaging devices and projecting illumination appropriate for its corresponding imaging device. The processing system 34 would in this embodiment include software to process the data from these two sets of images in parallel and then determine whether one set, or both combined, will best produce usable results at the then-current time.

3. Sequential imaging. Most railroad imaging applications assume the rolling stock is moving at some significant speed, requiring high-speed imaging to provide clear imagery.

However, there are situations in which rolling stock may routinely stop or move very slowly, such as at parts of a freight yard. In such an application, energy usage may be significantly reduced by time delay and integration (TDI), in which the data processing system 34 controls the units 10 and their component imaging devices 16 and illuminators 18. This is especially useful if a wheel is to have multiple lines projected upon it by multiple power-hungry lasers; using TDI, an image will be acquired with a first line illuminated, then another image acquired with the second line illuminated, and so on until there are X images, one for each line to be projected. Software then superimposes, or integrates, these images into a single image that can then be analyzed as though it were a single image recorded with all lasers active at once.

Figure 6:
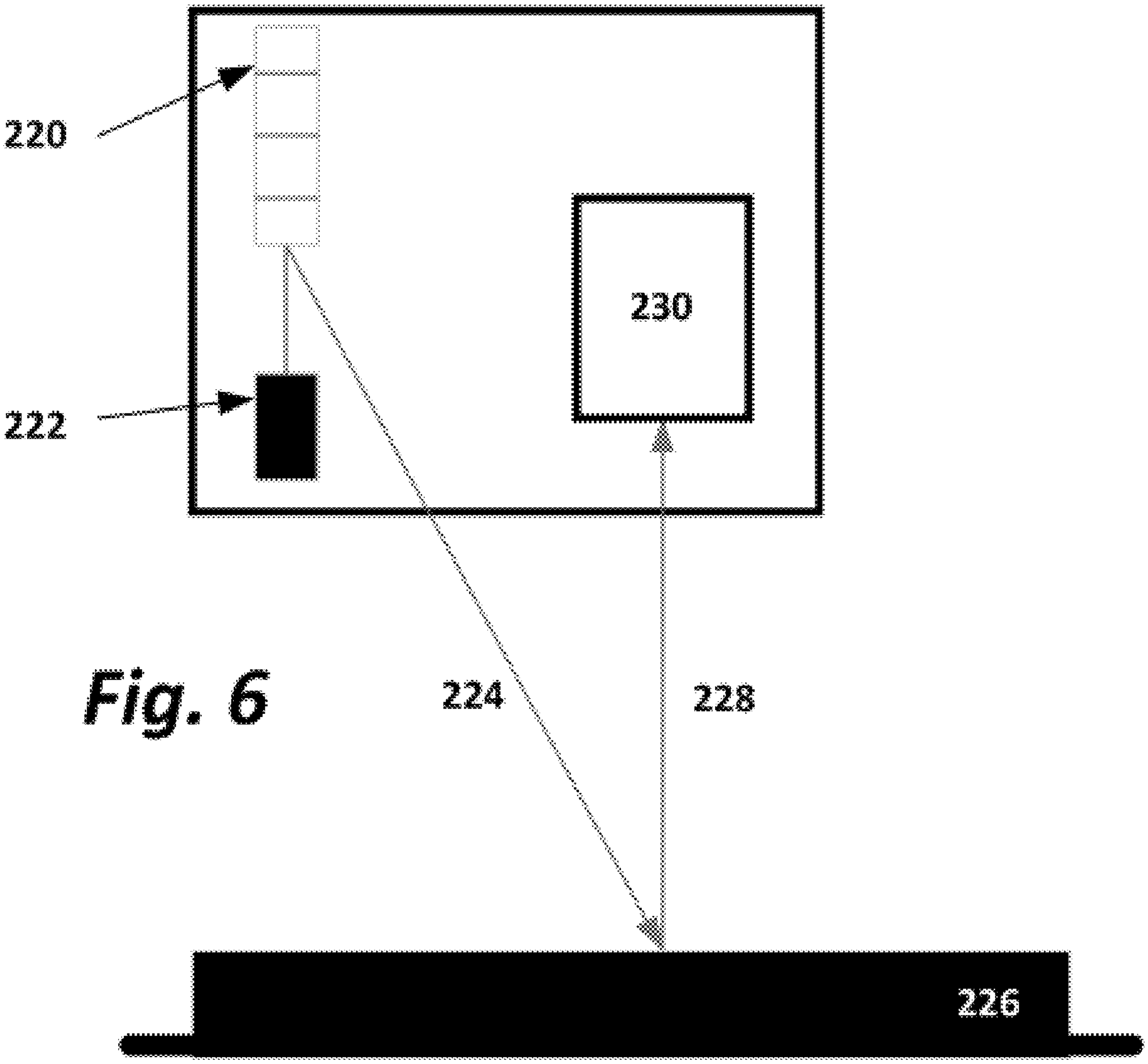
FIG. 6 illustrates an alternate embodiment in which a scanning method of illumination and imaging is used

4. Scanning/controlled illumination. The prior descriptions have assumed a static pattern of illumination projected onto the wheel. It is possible and in some situations preferable to permit direct control of illumination for specific purposes. In an alternate embodiment as shown in FIG. 6, an illumination device 220 generates a beam which is reflected from an illumination scanner 222 to produce reflected beam 224 which illuminates the wheel 226. By using scanner 222, which can be a MEMS based solid state scanner, an electromechanical scanner, or another type of scanner familiar to those skilled in the art, the scanner 222 can direct the beam 224 anywhere on the wheel 226. The reflected beam 228 is captured by an image acquisition device 230 which can be a single element device, a 1D array or a 2D array based on time of flight, or classic imaging technology. The alternate embodiment shown in FIG. 6 allows one to capture the 3D profile information of the wheel 226 while using much lower levels of illumination energy. Furthermore, the alternate embodiment as shown in FIG. 6 can be used to produce a lower cost solution as compared to prior art.

Figures 7A, 7B, 7C, 7D:
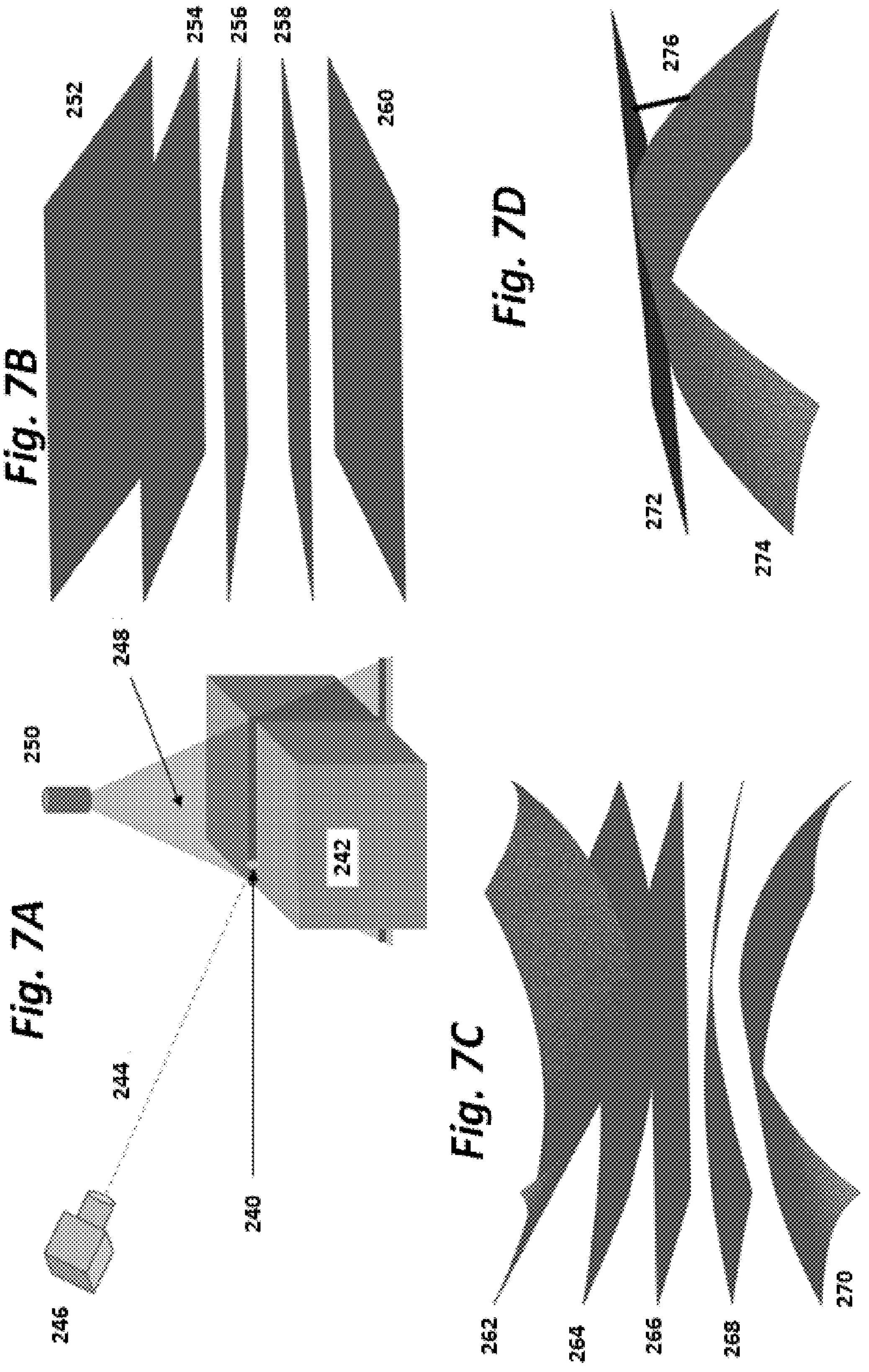
FIG. 7A illustrates the measurement of points on a line of illumination using the angle of a camera offset from the line of illumination on a body.
FIG. 7B illustrates illumination paths described by a set of parallel illumination lines.
FIG. 7C illustrates illumination paths described by a set of lines from a light source using a diffractive optical element.
FIG. 7D illustrates errors resulting from the assumption of planar rather than curved surface illumination paths.

5. Regardless of the form and pattern of illumination produced by the illumination device, accurate measurements require that the illumination path be accurately characterized. As shown in FIG. 7*a*, measurements of a point 240 on a target 242 are based on its three dimensional location as determined by the intersection at point 240 between the line of sight 244 of the imaging device 246 and the illumination path 248 produced by illumination device 250. In one embodiment, an illumination device generates parallel lines. As shown in FIG. 7*b*, the illumination path of each line is accurately represented by planar surfaces 252, 254, 256, 258, and 260 uniquely described by four geometric parameters. In another embodiment, an illuminating device generates multiple lines by the use of diffractive optical elements (DOEs). The illumination paths produced by this are illustrated in FIG. 7*c*, represented by surfaces 262, 264, 266, 268 and 270. In this case, only the illumination path of the central line 266 is accurately represented as a planar surface. The higher order lines experience increasing amounts of conical diffraction. As shown in FIG. 7*c*, the remaining illumination paths are more generally represented by quadric surfaces 262, 264, 268, and 270, each uniquely described by ten geometric parameters. The surface model that best represents the illumination path may be based on the underlying physics of the illumination path distortion or the geometry of the overall illumination pattern. In one embodiment presented above, a quadric surface can provide a model for the conical distortion of non-central lines of a DOE-based multi-line illuminator. In another embodiment, the cause of the illumination path non-linearity is unknown, and an existing model may not be immediately obvious. In this case, a surface model can be selected from a set of diverse general surface models, using statistical methods to determine the model that best represents the shape of the illumination path. Determining the selected surface model's parameters that best represent an illumination path requires a number of calibration images of a target exposed to the illumination path at various known locations and/or orientations relative to the illumination device and imaging device. To accurately describe the more complex surface of non-planar illumination paths (for example as described in the case of conic diffraction) a larger and more diverse set of calibration images needs to be acquired and analyzed. Once calibrated, accurate measurements of targets (such as wheels) can be taken based on the intersection of illumination paths with line of sight from the imaging device to points on the target.

Current art represents the illumination paths from a multi-line illumination device as separate planar surfaces. As shown in FIG. 7*d*, in the common case where the majority of these lines have non-zero curvature, assuming a planar illumination path 272 rather than a more complex surface model of illumination path 274 yields an error 276 in the calculated location of the illumination path. This in turn, results in target measurements with unnecessary and often excessive and unacceptable error.

Figure 8:
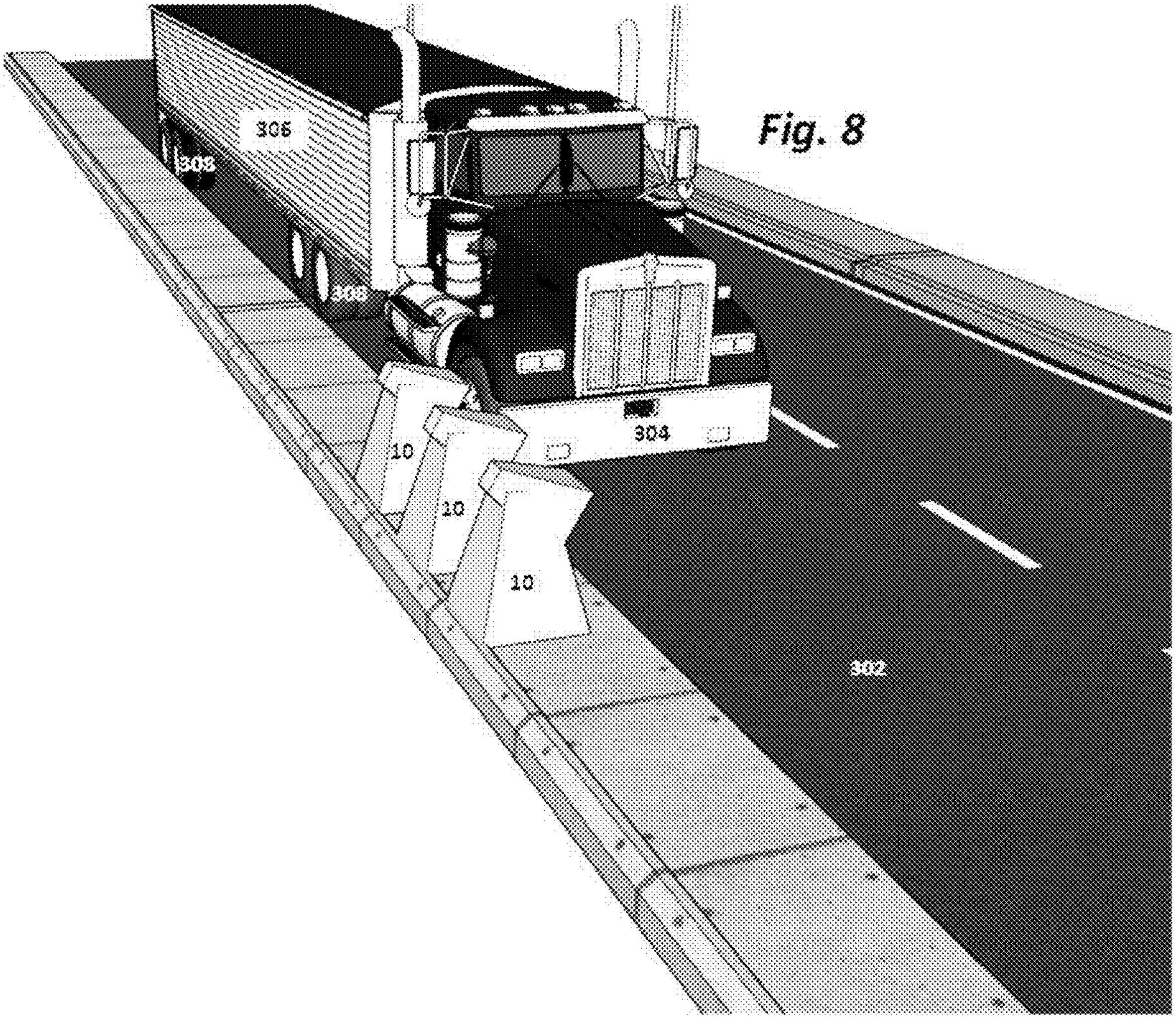
FIG. 8 illustrates an embodiment for use with commercial vehicles on roads

6. Another alternative embodiment addresses the use of the present invention on other vehicular wheels, as seen in FIG. 8. A set of the sensing systems 10 are placed at appropriate locations along a road 302 where commercial vehicles such as a truck 304 with a trailer 306 will pass; the systems 10 are spaced such that they can capture at least one revolution of any tires 308 of targeted vehicles. It is understood that while three systems 10 are shown in FIG. 8 there is neither a stated nor implied requirement that any embodiment of the system must use any particular number of the systems 10 except as may be required by the application.

Figure 9:
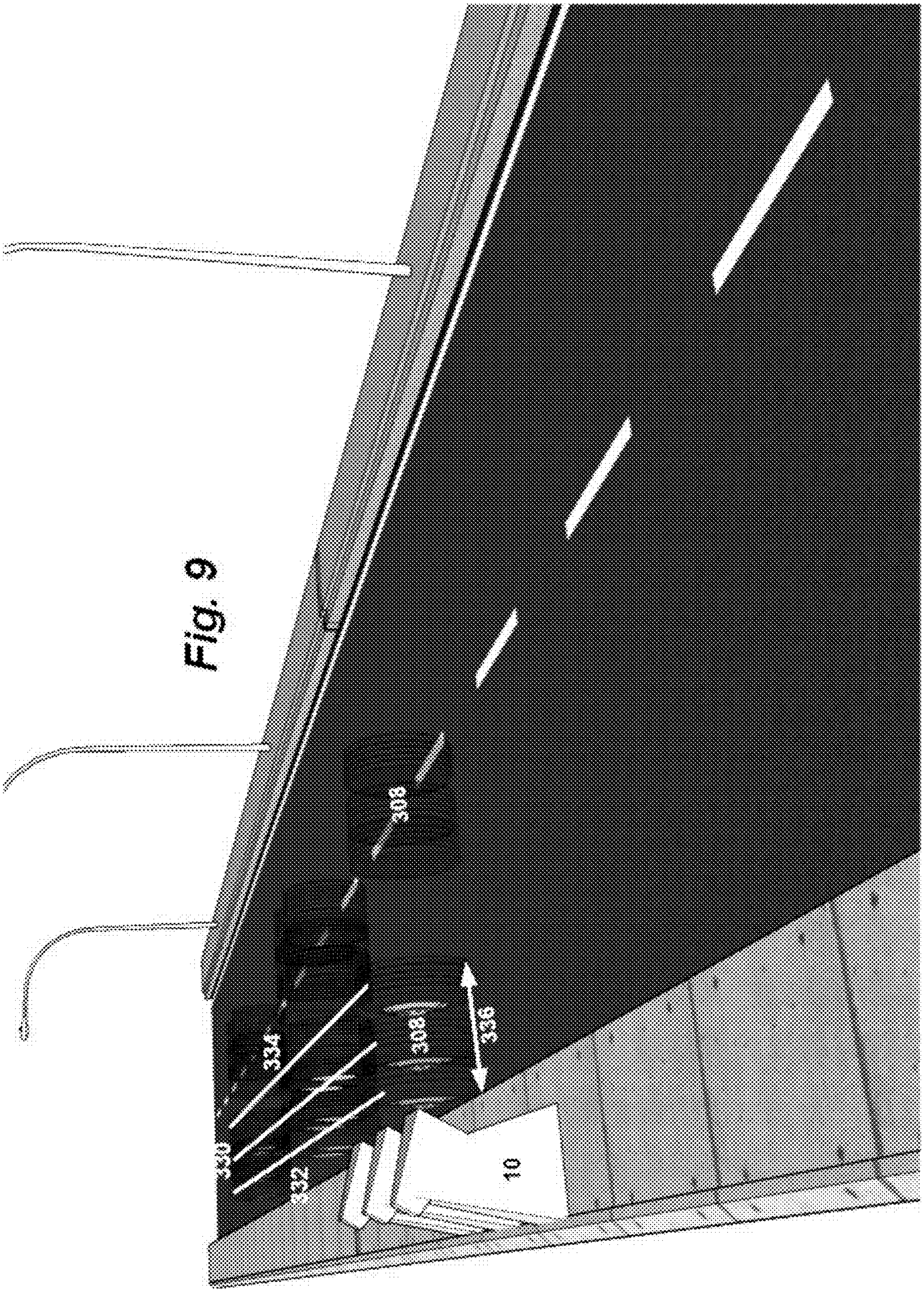
FIG. 9 illustrates the challenge of tire position variation in the commercial vehicle embodiment

There are several different challenges present in this particular application of the technology; some of these are:

A. Position tolerance. In a railroad application, the wheel is constrained by necessity to follow the path defined by the rail; the system can therefore be optimized to operate within the very narrow band of distance that encompasses the rail and the maximum side-to-side motion of the wheel on the rail, particularly including a vertical field of view precisely tailored to the known maximum angular coverage needed to see the portion of the wheel to be measured. A truck or other commercial vehicle can move freely on a road surface. While it can be assumed that the vehicle will, for duration of a measurement, remain within the bounds of a designated lane, this still provides far greater variation in the position of the measurement target; a typical lane is 12 feet in width, and a tractor-trailer is 8.5 feet in width, meaning that the position of a wheel within that lane could vary by as much as 3.5 feet. This is shown in FIG. 9, in which the tires 308 are shown without their attendant vehicle in three different poses. Line 330 shows the position of the right-side tires 308 when the vehicle to which the tires 308 belongs is roughly in the center of the lane. Line 332 shows the position of the tires 308 when the vehicle is riding very close to the curbside edge of the lane, and Line 334 shows the tire 308 position when the vehicle is riding the street-side edge of the lane. The distance 336 is roughly three and a half feet.

This affects the requirements of the imaging systems 10 in three ways. First, the field of view 22 must cover a greater vertical angle to ensure it can see the relevant portions of the passing tire 308 when very close or very far away, which may have implications on frame capture rates. Second, as the target object (tire 308) can be at a significantly varying distance, the optics of the imaging device 16 must be considered such as incorporating a greater depth of field (range in which objects are in sharp focus), or the use of motorized varifocal lenses, liquid lenses, or other such techniques known to those skilled in the art. Third, the horizontal angle of the field of view must also increase, as when the tires 308 are very close they will cross the field of view more quickly, and thus will less of a full rotation, than they will when more distant. Selection of appropriate lenses will address the field of view issues, and one method known to those skilled in the art to achieve greater depth of field is to simply reduce the aperture of the lens; at worst, this may require an increase in illumination or camera sensitivity to counter the loss of light from the reduction in aperture.

B. Tire presentation. Once more, train wheels are constrained in their presentation to the system by their presence on the rail; moreover, train wheels are rigidly fixed in terms of their side to side alignment, as they are on a solid axle. Road vehicles may be turning at some point in their passage, which—especially in the case of front wheels, which carry out the actual turning—can cause them to be presented in a manner other than the preferred one, as seen in FIG. 10. In FIG. 10*a*, viewpoint 360, equivalent to the imaging system 16 in one of the sensing systems 10, observes a simplified passing tire 362. Lines of sight 364, 366, and 368 indicate the positions of points 370, 372, and 374, respectively. Point 370 is the visible left edge of the tire, point 372 the center of the tire, and point 374 the right edge of the tire. Line 376 drawn perpendicular to viewpoint 360's imaging plane 378 through point 370 defines the horizontal location of the left edge of the tire 362, and similarly line 380 through point 374 defines the horizontal location of the left edge of the tire 362. The distance between lines 376 and 380, therefore, define the effective diameter 382 of the tire 362. As the tire 362 is aligned with the theoretical roadway, the distance for all three points 370, 372, 374 is identical.

Figure 10B:
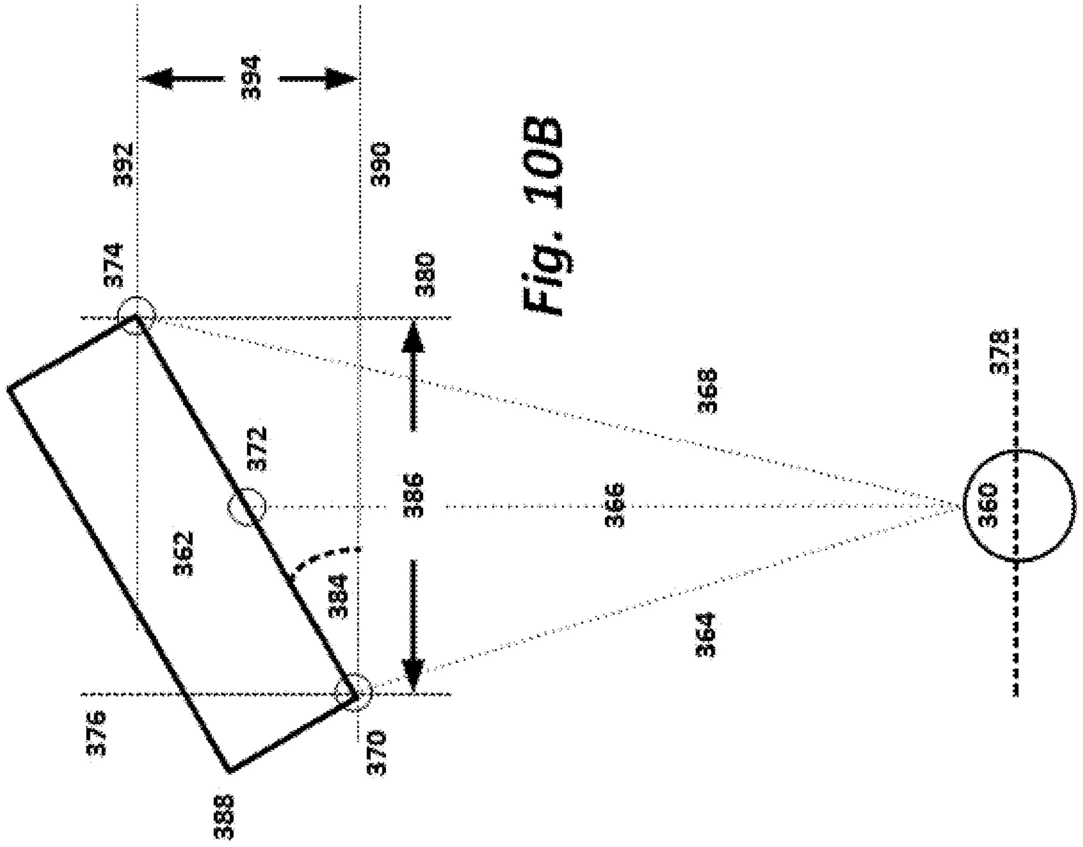
FIG. 10B illustrates a tire presented at an angle to the invention in the commercial vehicle embodiment.
Figure 10A:
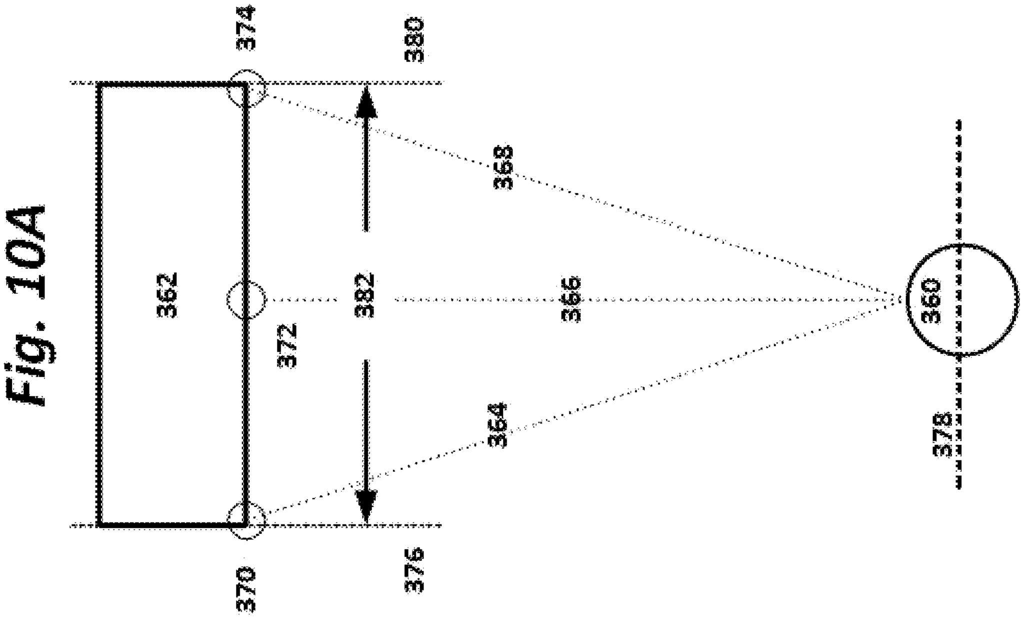
FIG. 10A illustrates a tire presented face-on to the invention in the commercial vehicle embodiment.

However, in FIG. 10*b*, the simplified tire 362 is turned at an angle 382 to the imaging plane of viewpoint 360. Because of this, while the lines 376 through point 370 and 380 through point 374 still define the horizontal locations of the left and right edges of the tire 362, the apparent diameter 384 is not identical to the actual diameter 380; it will be smaller by the cosine of angle 382. More importantly, the change in presented angle will distort the shape of other features (for example, axle, bolts, or flaws) the system may wish to detect, and make these features much harder to find with confidence. In addition, depending on the angle 384, some parts of the tire 362 which were not previously visible, such as rear corner 388, may be visible to imaging device 360, which will complicate the recognition of the key features of the tire 362. The distance of the points 370, 372, and 374 also is no longer identical, but varies. A line 390 drawn parallel with the imaging plane 378 from point 370 and another line 392 drawn parallel with the imaging plane define the distance or depth variation 394. The fact that the preferred embodiment of the invention makes use of a distance-based measurement method makes this an eminently addressable challenge. The combination of the measured diameter 386 and the depth variation 394 provide the two sides of a right triangle whose hypotenuse is the true diameter 382, and from these three dimensions the value of angle 384 may be calculated; this permits the image to be corrected for the angular distortion, at which point the regular blob and feature analysis may be used to determine the presence or absence of flaws or damage on the tire. There are inherent methods to check the accuracy and reliability of the features being used for these measurements. For example, it could be envisioned that point 370 was on a damaged portion of the wheel or tire and thus displaced from its nominal ideal location. It would be extremely unlikely that point 374 would be on a similarly damaged portion. A comparison between the distances and depths of 370-372 and 372-374 would reveal one of them to have changed its expected relationship with central point 370. Similar methods of checking validity and reliability of measurements are well known to those skilled in the art and are included in this invention.

C. Tire size variation. While railroad wheels vary in size, the vast majority of railroad wheels used in the USA may be constrained to a small number of sizes. Trucks can have a wide variation in tire sizes, based on their particular design use; for example, a typical tractor-trailer may use tires of 22.5 or 24.5 inches in diameter (meaning either completes a full revolution in well under 7 feet), while a dump truck may have tires exceeding seven feet in diameter. This may be addressed by either restricting the target wheels to be examined by the invention, or by having imagers of sufficient resolution to be able to use wider fields of view, or by using additional sensor units 10 to cover longer sensing pathways.

D. Components. Railroad wheels are effectively monolithic blocks of steel; while they can be divided into different segments (face, rim, tread, etc.), all of these are merely parts of one single object. A truck wheel is comprised of two major portions, the tire—the multilayered, inflated rubber portion that actually contacts the road—and the rim, on which the rubber wheel is placed. These are different objects and observing their condition requires some different processes; for example, unlike railroad wheels, a truck tire noticeably deforms during use. These may be addressed by numerous image-analysis methods known to those skilled in the art.

E. Targets/measurements. On a railroad wheel, the tread of the wheel—the portion which contacts the rail and is thus the actual working surface—is essentially featureless under normal conditions, aside from the texture and coloration aspects of the actual steel used in the manufacture; a railroad wheel in use is often a highly polished mirror. Thus, any significant variations in the tread appearance are highly likely to be indicative of flaws of some description (shelled tread, slid flats, etc.). By contrast, essentially all roadway vehicle tires have specific tread—detailed patterns that are designed to improve the function of the tire in various types of weather and terrain conditions. To determine if a flaw exists requires evaluating the pattern, and the relief thereof, in detail. This may be addressed by numerous methods known to those skilled in the art; one obvious method is to ensure that the imaging devices have both sufficient resolution to resolve the small variations in pixel location that would be seen for tread depth variation, and sufficient dynamic range to be able to reliably visualize the tread ridges and grooves.

The foregoing description of various embodiments of this invention has been presented for purposes of illustration and description. It is not intended to be exhaustive or to limit the invention to the precise form disclosed and inherently many more modifications and variations are possible. All such modifications and variations that may be apparent to persons skilled in the art that are exposed to the concepts described herein or in the actual work product, are intended to be included within the scope of this invention disclosure.

What is claimed is:

1. A system for detection and measurement of flaws on vehicle wheels, comprising:

at least one sensing device;

at least one imaging device contained within an enclosure that is or contains supporting structure for the at least one imaging device;

at least one illumination device configured to illuminate at least one field of illumination for the at least one sensing device, wherein the at least one illumination device produces a plurality of non-parallel, non-planar, and non-intersecting illumination paths spaced to detect a flaw of a predetermined minimum size; and a controller in communication with the at least one sensing device and configured to:

detect a passing wheel;

perform image data collection from the at least one imaging device based on a presence and a position of the passing wheel, wherein the image data is acquired by the at least one imaging device when the position of the passing wheel corresponds to a location at which the plurality of non-parallel, non-planar, and non-intersecting illumination paths produced by the at least one illumination device form non-parallel, non-planar, and non-intersecting lines on the passing wheel when the passing wheel has no defects; and perform data analysis on the image data for detection of wheel measurements or flaws relating to the passing wheel.

2. The system of claim 1, in which the passing wheel is a railroad vehicle wheel.

3. The system of claim 1, in which at least one field of view of the at least one sensing device comprises at least one full revolution of the passing wheel.

4. The system of claim 3, in which the at least one field of illumination for the at least one sensing device substantially coincides with the at least one field of view of the at least one sensing device.

5. The system of claim 3, in which the at least one imaging device is positioned to capture images of the passing wheel on a field side at an angle substantially perpendicular to a direction of travel.

6. The system of claim 3, in which the at least one imaging device is positioned to capture images of the passing wheel on a field side at an angle nearly parallel to a direction of travel.

7. The system of claim 1, wherein the at least one illumination device produces at least one planar illumination path.

8. The system of claim 1, in which the plurality of non-parallel, non-planar, and non-intersecting illumination paths are represented by quadratic surfaces.

9. The system of claim 1, in which the plurality of non-parallel, non-planar, and non-intersecting illumination paths are generated from a single illuminator with a beam splitter.

10. The system of claim 1, in which a line formed on the passing wheel by an illumination path of the illumination paths intersects opposing sides of the passing wheel.

11. The system of claim 1, in which the at least one illumination device is housed separately from the at least one imaging device to provide illumination at a distance from the at least one imaging device.

12. The system of claim 1, in which the passing wheel is a wheel of a commercial vehicle.

13. The system of claim 1, wherein the at least one illumination device emits infrared light and the at least one imaging device is sensitive to the infrared light.

14. The system of claim 1, wherein the data analysis includes comparing blob locations identified in the image data to precomputed blob location estimates, wherein additional data analysis is only required when the comparing indicates at least one blob location is abnormal.

15. The system of claim 1, wherein the data analysis uses a trained deep learning model implemented on the controller for detecting the flaws.

16. The system of claim 1, wherein the at least one imaging device includes a first imaging device sensitive to a first radiation type and a second imaging device sensitive to a second radiation type different from the first radiation type, wherein the controller is configured to determine whether the first imaging device or the second imaging device provides a higher quality of image data for analysis.

17. The system of claim 1, wherein the plurality of non-parallel, non-planar, and non-intersecting illumination paths are generated using diffractive optical elements.

18. A method for detection and measurement of flaws on vehicle wheels, the method comprising:

calibrating at least one imaging device contained within an enclosure that is or contains supporting structure for the at least one imaging device such that illumination paths produced by at least one illumination device are accurately characterized and known by a data processing system, wherein the illumination paths include a plurality of non-parallel, non-planar, and non-intersecting illumination paths spaced to detect a flaw of a predetermined minimum size;

detecting or identifying, with at least one sensing device, a passing wheel entering an active portion of a measurement system illuminated by the illumination paths;

acquiring, with the at least one imaging device, images of the passing wheel while illuminated by the at least one illumination device, wherein the images are acquired by the at least one imaging device when the position of the passing wheel corresponds to a location at which the plurality of non-parallel, non-planar, and non-intersecting illumination paths produced by the at least one illumination device form non-parallel, non-planar, and non-intersecting lines on the passing wheel when the passing wheel has no defects;

the data processing system processing the images to determine if defects or anomalies relating to the passing wheel are present;

the data processing system measuring the size of any identified defects or anomalies;

the data processing system triggering an alert if a defect or anomaly of a minimum predetermined size is present; and the data processing system appending all data to a record associated with the passing wheel.

19. The method of claim 18, where the data processing system processing the images includes:

the data processing system analyzing the images to extract measurements of a wheel surface; and the data processing system comparing the measured wheel surface to at least one of a plurality of standard wheel models.

20. The method of claim 18, where the data processing system processing the images includes:

the data processing system analyzing the images to extract features of a wheel surface; and the data processing system comparing the extracted features against precomputed estimates.

21. The method of claim 18, where the data processing system processing the images includes analysis via deep learning to identify the defects or the abnormalities.

22. The method of claim 18, where the data processing system processing the images includes compensating for differences in wheel size of passing wheels.

23. The method of claim 18, where the data processing system processing the images includes compensating for differences in wheel presentation of passing wheels.

24. The method of claim 18, where the data processing system processing the images also includes compensating for differences in wheel position of passing wheels.

* * * * *